United States Patent
Nishimura et al.

(10) Patent No.: US 6,430,063 B1
(45) Date of Patent: Aug. 6, 2002

(54) CONTROL SWITCH FOR SYNCHRONOUS RECTIFICATION CIRCUIT OF DC-DC CONVERTER

(75) Inventors: Katsuhiko Nishimura; Kazuo Kobayashi; Yoshiki Kubota, all of Kawasaki (JP)

(73) Assignee: Fujitsu Denso Ltd., Kanagawa (JP)

( * ) Notice: Subject to any disclaimer, the term of this patent is extended or adjusted under 35 U.S.C. 154(b) by 0 days.

(21) Appl. No.: 09/844,871

(22) Filed: Apr. 27, 2001

(30) Foreign Application Priority Data

Aug. 21, 2000 (JP) ........................................ 2000-249280

(51) Int. Cl.[7] ............................................. H02M 3/335
(52) U.S. Cl. ..................................... 363/21.06; 363/127
(58) Field of Search ........................ 363/17, 20, 21.01, 363/21.04, 21.06, 125, 127

(56) References Cited

U.S. PATENT DOCUMENTS 3,582,758 A * 6/1971 Gunn .......................... 363/127
3,663,941 A * 5/1972 Pasciutti ...................... 363/127
6,191,965 B1 * 2/2001 Matsumoto .................... 363/89
6,246,593 B1 * 6/2001 Cheng .......................... 363/17

* cited by examiner

Primary Examiner—Adolf Deneke Berhane
(74) Attorney, Agent, or Firm—Jenkens & Gilchrist, A Professional Corporation

(57) ABSTRACT

A primary side of a transformer has a switching transistor to on-off control the current flowing in a primary winding on a primary side. A secondary side of the transformer has a commutating side FET to be turned on by applying the induced voltage of a tertiary winding on a secondary side of a current transformer, and a flywheel side FET with the primary winding on the primary side of the current transformer connected thereto in series. The current transformation ratio of the current transformer is small in the initial period when the flywheel side FET is turned on, and then, the current transformation ratio is increased by current controlling means comprising a saturable reactor, a diode or the like.

8 Claims, 10 Drawing Sheets

Prior Art

CONTROL SWITCH FOR SYNCHRONOUS RECTIFICATION CIRCUIT OF DC-DC CONVERTER

BACKGROUND OF THE INVENTION

1. Field of the Invention

The present invention relates to a synchronous rectification circuit of a DC-DC converter to commutate the voltage induces in a secondary winding of a transformer by implementing the on-off control of a commutation side field-effect transistor and a flywheel side field-effect transistor synchronously with the on-off operation of a switching transistor connected to a primary winding of the transformer.

2. Description of the Related Art

A diode has been generally employed in a commutating circuit of conventional DC-DC converters. However, the power loss due to the forward voltage drop of the diode is not negligible but large. Thus, in recent years, a Schottky diode small in power loss due to the forward voltage drop has been extensively employed.

An FET (Field-Effect Transistor) of at most several mΩ in ON-resistance was developed. Thus, the power loss can be more reduced by using such an FET in a commutating circuit than by using the Schottky diode.

Thus, a configuration was proposed, in which the FET is connected to a primary winding of a transformer as a switching transistor, and is used in the commutating circuit of the DC-DC converter. In this case, the FET as the switching transistor implements the on-off control of the FET of the commutating circuit in a synchronous manner with the on-off timing. The commutating circuit can thus commutate the induced voltage in the secondary winding of the transformer with less power loss.

FIG. 1 is a circuit diagram of a conventional DC-DC converter, indicating a synchronous rectification circuit applied to a forward converter. In FIG. 1, T denotes a transformer, n1 denotes a primary winding, n2 denotes a secondary winding, Q1 denotes a switching transistor (FET, Q2 denotes a commutating side FET, Q3 denotes a flywheel side FET, and L and C1 denote a reactor and a capacitor to constitute a smoothing circuit, respectively. A control circuit 1 detects the output voltage Vout, and controls the ON-period of the switching transistor Q1 by controlling the pulse width or the like. This means that the control circuit 1 controls the ON-period and the OFF-period of the switching transistor Q1 so that the smoothed output voltage Vout is the preset voltage. More specifically, the switching transistor Q1 turns on/off the current flowing in the primary winding n1 of the transformer T based on the input voltage Vin. The control circuit 1 shortens the ON-period when the output voltage Vout is higher than the preset voltage, and extends the ON-period when the output voltage Vout is lower than the preset voltage. The control circuit 1 controls the output voltage Vout to be constant by the above operation. The detailed operation is described below.

When the switching transistor Q1 is turned on, the commutating side FET Q2 is turned on by the induced voltage in the secondary winding n2 of the transformer T. As a result, the current flows in the capacitor C1 via the reactor L. In this condition, the flywheel side FET Q3 is turned off.

When the switching transistor Q1 is turned off, the polarity of the induced voltage in the secondary winding n2 of the transformer T is inverted, and the commutating side FET Q2 is turned off. As a result, the flywheel side FET Q3 is turned on, and the current attributable to the accumulated energy in the reactor L flows in the capacitor C1.

However, the transformer T is reset (to make the accumulated energy in the transformer T zero) through the resonance effect of the parasitic capacitance or the like or the switching transistor Q1 with the inductance of the transformer T. After the transformer T is reset, the induced voltage in the secondary winging n2 becomes zero. This means that the voltage applied to the gate of the flywheel side FET Q3 becomes zero during the OFF-period of the switching transistor Q1, and the flywheel side FET Q3 is turned off. Thus, the flywheel current flows via a parasitic diode (a body diode) of the flywheel side FET Q3, raising a problem of not taking advantage of the low ON-resistance of the FET.

Thus, the DC-DC converter shown in FIG. 2 was proposed. In the figure, the same symbols as those in FIG. 1 show the same parts. In FIG. 2, n3 denotes a tertiary winding of a transformer T, CT denotes a current transformer, Q4 denotes a transistor, D7 and D8 denote diodes (body diodes), Cgs denotes the gate-source parasitic capacitance (input capacitance), and Cgd denotes the gate-drain parasitic capacitance (input capacitance), respectively. The control circuit 1 used to implement the on-off control of the switching transistor Q1 by detecting the output voltage Vout is omitted in the figure.

The tertiary winding n3 is provided on the transformer T, and the induced voltage in this tertiary winding n3 is applied to the gate of the commutating side FET Q2. When the switching transistor Q1 turned on/off thereby, the commutating side FET Q2 is turned on/off in a synchronous manner with the on-off operation of the switching transistor Q1.

The primary winding of the current transformer CT is connected in series to the flywheel side FET Q3, and the induced voltage in the secondary winding is applied to the gate of the flywheel side FET Q3 via the diodes D7 and D8. The resistor R3 corresponds to the terminating resistor of the current transformer CT. The induced voltage in the secondary winding of the current transformer CT is applied to the Zener diode ZD7. The Zener diode ZD7 suppresses the voltage across the resistor R3 to the Zener voltage, and applies it to the base of the transistor Q4. Further, the Zener diode ZD7 suppresses the voltage across the resistor R3 to the Zener voltage, and applies it to the gate of the flywheel side FET Q3 via the diode D8.

When the switching transistor Q1 on the primary side of the transformer T is turned on, the commutating side FET Q2 is turned on by the induced voltage in the tertiary winding n3 of the transformer T. As a result, the current by the induced voltage in the secondary winding n2 flows via the turned-on commutating side FET Q2. In this condition, the flywheel side FET Q3 is turned off.

When the switching transistor Q1 is turned off, the polarity of the induced voltage in the tertiary winding n3 of the transformer T is inverted, and the commutating side FET Q2 is turned off. The flywheel current flows via the body diode Dq3 of the flywheel side FET Q3. This current flows in the primary winding of the current transformer CT. As a result, the induced voltage in the secondary winding of the current transformer CT is applied to the gate of the flywheel side FET Q3 via the diodes D7 and D8 to charge the input capacitances Cgs and Cgd. When this charging voltage exceeds the threshold, the flywheel side FET Q3 is turned on. Even when the induced voltage in the secondary winding n2 becomes completely zero by resetting the transformer T, the flywheel side FET Q3 continues the ON condition thereof by the induced voltage in the secondary winding of the current transformer CT.

FIG. 3 shows the flywheel side FET Q3 illustrated in FIG. 2 as a three-terminal element. FIG. 4, similar to FIG. 3, shows the flywheel side FET Q3 illustrated in FIG. 2 as a two-terminal element. More specifically, the induced voltage in the secondary winding of the current transformer CT is applied to the gate of the flywheel side FET Q3. This means that the flywheel side FET Q3 is turned off by the induced voltage in the secondary winding of the current transformer CT if the forward, current flows in the body diode thereof. Thus, in this case, the flywheel side FET Q3 can be used for the two-terminal element diode of the low voltage drop characteristic as illustrated in FIG. 4.

FIG. 5 is a schematic representation of the current waveform and the voltage waveform on the flywheel side FET Q3 shown in FIG. 2.

In FIG. 5, Id denotes the current flowing in the primary winding of the current transformer CT, Vgs denotes the gate-source voltage, and Vds denotes the drain-source voltage. TS denotes the period of the on-off control, Ton and Toff denote the ON-period and OFF period of the switching transistor Q3, Vf denotes the forward voltage of the body diode Dq3, and Td denotes the current flow period of the body diode Dq3.

When the switching transistor Q1 is turned on, the flywheel side FET Q3 is turned off as described above, and the drain-source voltage Vds is increased. When the switching transistor Q1 is turned off, the current flows via the body diode Dq3 of the flywheel side FET Q3 after a specified time is elapsed. Thus, the drain-source voltage Vds becomes the forward voltage Vf of the body diode Dq3. As illustrated in FIG. 5, the flywheel side FET Q3 is turned on by the induced voltage in the secondary winding of the current transformer CT after the period Td is elapsed, and the drain-source voltage Vds thereof becomes substantially zero.

FIG. 6 is a measured waveform chart to show the operation of the prior art technology shown in FIG. 2. In FIG. 6, Q1Vds and Q1Id denote the drain-source voltage and the drain current of the switching transistor Q1, and Q3Vgs and Q3Vds denote the gate-source voltage and the drain-source voltage of the flywheel side FET Q3. Td denotes the current flow period in the body diode Dq3 of the flywheel side FET Q3. As illustrated in FIG. 6, the current flow period Td in the body diode Dq3 of the flywheel side FET Q3 is relatively long as described in relation to FIG. 2.

The prior art technology shown in FIG. 2 involves the following problems.

In the process to turn on the flywheel side FET Q3, a specified time is required for the rise of the gate-source voltage Vgs. Thus, the loss in the current flow period Td in the body diode Dq3 becomes a problem.

To shorten the above period Td, the following countermeasures may generally be taken. The current transformer CT which can rapidly charge the input capacity. Cgs of the flywheel side FET Q3 is used so that the gate-source voltage Vgs may be charged in a short time.

However, if such a current transformer CT is used, the current flowing in the secondary winding of the current transformer CT is increased, and the driving loss of the flywheel side FET Q3 is increased, raising a problem that the driving loss of the synchronous rectification circuit of the DC-DC converter can not be reduced.

SUMMARY OF THE INVENTION

Accordingly, a first object of the present invention is to reduce the driving loss (the power loss) of a synchronous rectification circuit of a DC-DC converter with a relatively simple configuration.

A second object of the present invention is to increase the speed of the turning on of a flywheel side FET included in the synchronous rectification circuit, and to reduce the loss by a body diode.

A third object of the present invention is to reduce the driving loss after the flywheel side FET included in the synchronous rectification circuit is turned on.

A fourth object of the present invention is to prevent the DC-DC converter in the light-load mode from being inoperable due to the driving loss of the flywheel side FET included in the synchronous rectification circuit.

A fifth object is to prevent the ratio of the ON-period to the OFF-period of a switching transistor provided on the primary side of a transformer from being limited. In other words, a current transformer included in the synchronous rectification circuit must usually prevent the saturation of the core thereof. For this purpose, the ratio of the ON-period to the OFF-period of the switching transistor is limited so that the product of the current and the time corresponding to the ON-period of the switching transistor is substantially equal to the product of the current and the time corresponding to the OFF-period of the switching transistor.

The first to third objects are achieved by changing the current transformation ratio of the current transformer included in the synchronous rectification circuit as described below, wherein the current transformation ratio means the ratio of the current I1 flowing in the primary winding to the current I2 flowing in the secondary winding of the current transformer (I1/I2).

According to one of the aspects of the present invention, the present invention includes a current controlling part for setting the current transformation ratio of the above current transformer to be a small value during the initial period when the flywheel side FET is turned on, and sets the current transformation ratio of the current transformer to be a large value after the above-described initial period has elapsed.

The input capacitance of the flywheel side FET is rapidly charged, and the turn-on speed of the flywheel side FET is increased. As a result, the driving loss attributable to the body diode of the flywheel side FET is reduced. The driving loss is also reduced after the flywheel side FET is turned on.

The fourth object of the present invention can be achieved in the following way.

According to another aspect of the present invention, it is possible to omit a terminating resistor on the secondary side of the saturable current transformer because the saturable current transformer is used for a current transformer of the synchronous rectification circuit. Since power consumption by the terminating resistor is eliminated, cases can be prevented where the flywheel side FET cannot be driven in a light-load mode.

The fifth object of the present invention can be achieved in the following way.

According to another aspect of the present invention, the saturable current transformer induces the voltage in the secondary winging and the current flows, only in the initial period when the switching transistor provided on the primary side of the transformer turns on/off. Thus, the ratio of the ON-period of the switching transistor to the OFF-period can be arbitrarily controlled. Thus, a problem of the core saturating because of the long ON-period of the FET by using a regular current transformer can be solved by using the saturable current transformer.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENTS

The embodiments of the present invention will be described below.

Figure 7:
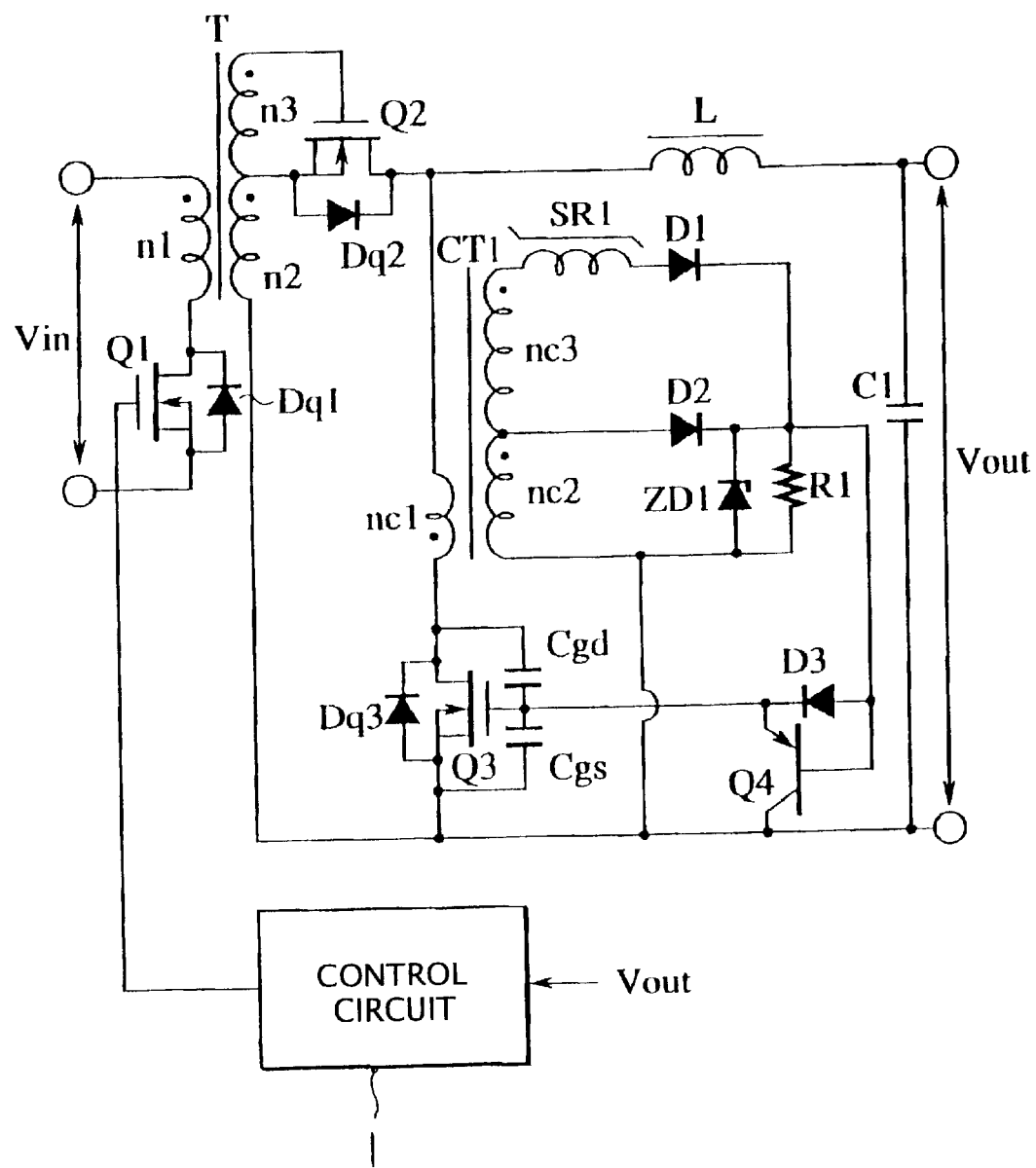
FIG. 7 is a circuit diagram of a first embodiment of the present invention.

FIG. 7 is a circuit diagram according to a first embodiment of the present invention. In FIG. 7, T denotes a transformer, n1 denotes a primary winding, n2 denotes a secondary winding, n3 denotes a tertiary winding, Q1 denotes a switching transistor (FET), Q2 denotes a commutating side FET, Q3 denotes a flywheel side FET, Dq1 to Dq3 denote parasitic diode (a body diode), Q4 denotes a transistor, CT1 denotes a current transformer, nc1, nc2 and nc3 denote a primary winding, secondary winding, and a tertiary winding of the current transformer CT1, D1 to D3 denote first to third diodes, ZD1 denotes a Zener diode, R1 denotes a resistor, L denotes a reactor, C1 denotes a reactor, C1 denotes a capacitor, Cgd denotes a gate-drain parasitic capacitance (input capacitance), Cgs denotes a gate-source parasitic capacitance (input capacitance), SR1 denotes a saturable reactor, and numeral 1 denotes a control circuit.

The configuration where the control circuit 1 compares the output voltage Vout with the preset voltage to implement the on-off control of the switching transistor Q1 to which the input voltage Vin is applied is similar to the conventional one. When the switching transistor Q1 is turned on, the commutating side FET Q2 is turned on by the induced voltage of the tertiary winding n3 of the transformer T, and the flywheel side FET Q3 is turned off.

The secondary winding nc2 and the tertiary winding nc3 are connected in series to the secondary side of the current transformer CT1. The secondary winding nc2 side is connected to the source of the flywheel side FET Q3 and the collector of the transistor Q4. The tertiary winding nc3 side is connected to a series circuit of the saturable reactor SR1 and the diode D1. The diode D2 is connected to a tap of a connection point of the secondary winding nc2 to the tertiary winding nc3.

The voltage via the diodes D1 and D2 is applied to the parallel circuit of the Zener diode ZD1 and the resistor R1. The voltage across the resistor R1 is thus applied to the base of the transistor Q4, and the voltage across the resistor R1 is applied to the gate of the flywheel side FET Q3 via the diode D3.

Figure 1:
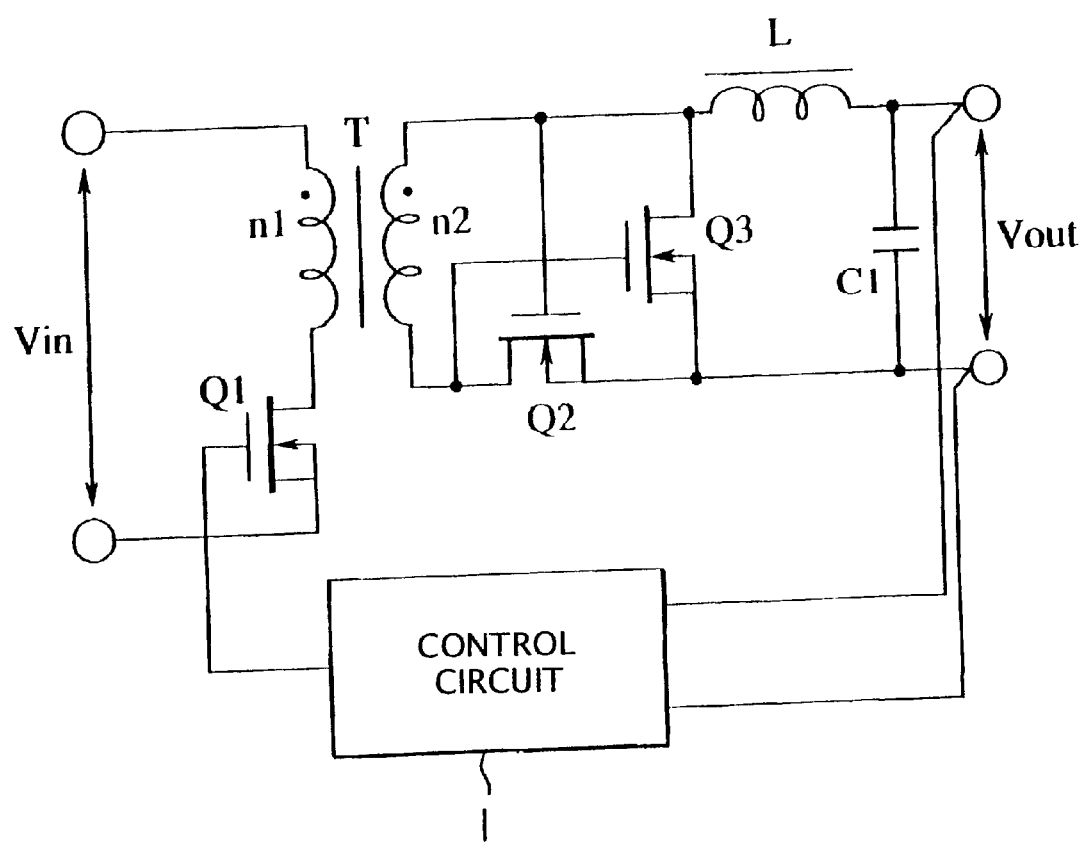
FIG. 1 is a circuit diagram of a first example of a conventional DC-DC converter.
Figure 2:
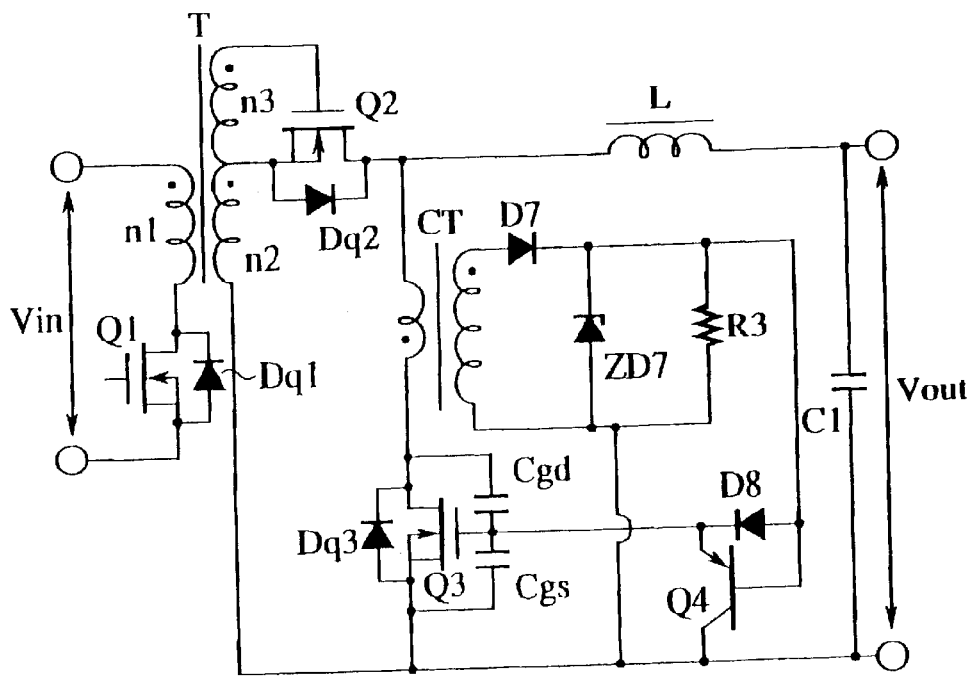
FIG. 2 is a circuit diagram of a second example of a conventional DC-DC converter.
Figure 3:
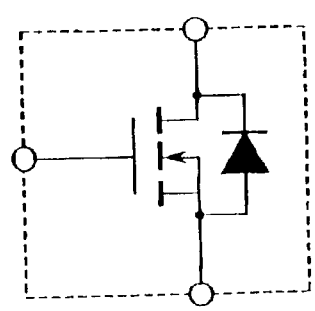
FIG. 3 shows a flywheel side FET Q3 in FIG. 2 comprising a three-terminal element.
Figure 4:
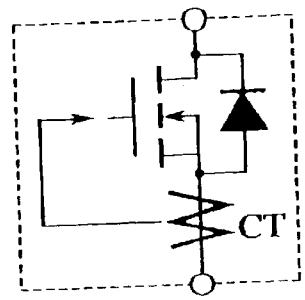
FIG. 4 shows a flywheel side FET Q3 in FIG. 2 comprising a two-terminal element.
Figure 5:
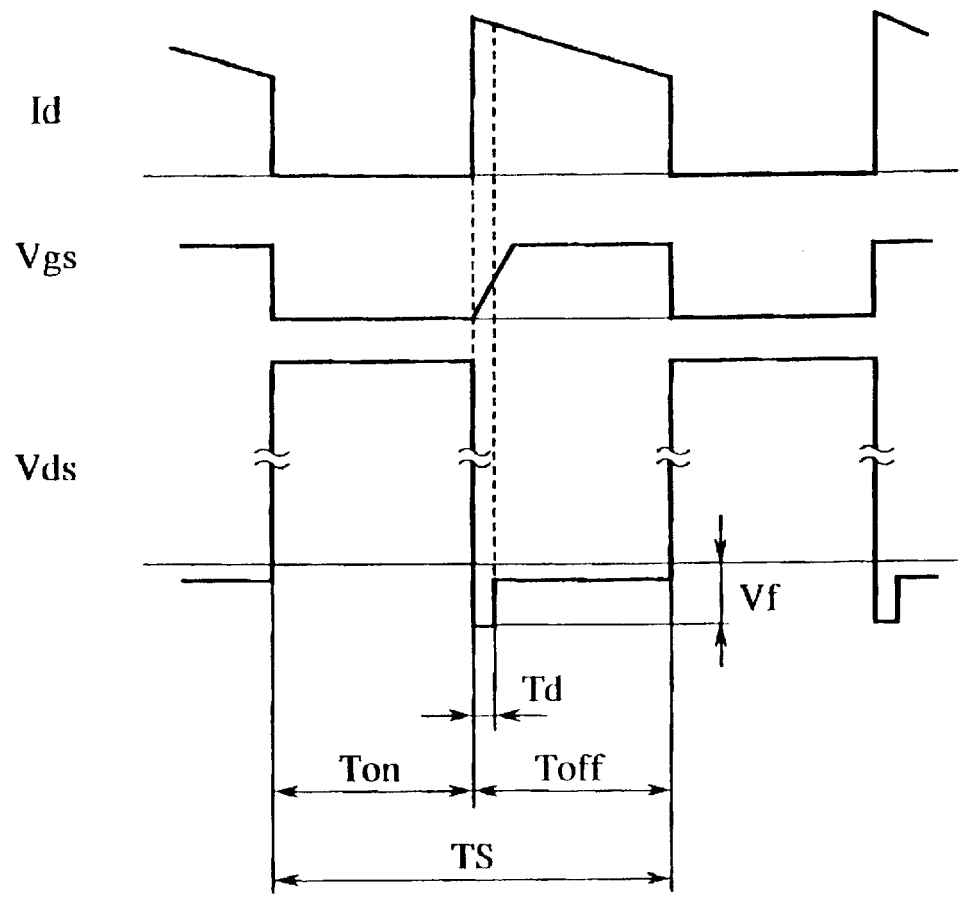
FIG. 5 is a waveform chart showing the outline of the current waveform and the voltage waveform of the flywheel side FET Q3 in FIG. 2.

Thus, the secondary winding of the current transformer CT shown in FIG. 2 corresponds to the secondary winding nc2 of the above-described current transformer CT1. The tertiary winding nc3, the saturable reactor SR1 and the diode D1 are serially connected to the secondary winding nc2, to realize the configuration that can substantially switch the current transformation ratio (i.e., a reciprocal number of the winding ratio Nnc1/Nnc2). The current transformation ratio is set to be smaller than the current transformation ratio in the above-described prior art technology.

As described above, when the switching transistor Q1 is turned off after it is turned on, the commutating side FET Q2 is turned off since the induced voltage of the tertiary winding n3 of the transformer T is of the reverse polarity. Thus, the flywheel current flows via the body diode Dq3 of the flywheel side FET Q3. This current flows in the primary winding nc1 of the current transformer CT1, and the voltage is induced in the secondary winding nc2 and the tertiary winding nc3.

Since the saturable reactor SR1 is not in a saturated condition, the impedance thereof is a large value. Thus, the current flowing via the diode D1 due to the induced voltage of the tertiary winding nc3 can be neglected. As a result, the induced voltage of the secondary winding nc2 is applied to the gate of the flywheel side FET Q3 via the diodes D2 and D3, and also applied to the base of the transistor Q4 via the diode D2. The input capacitance Cgs of the flywheel side FET Q3 can be rapidly charged by the large current generated by the secondary winding nc2 in the initial stage when the flywheel side FET Q3 is turned on, since current transformation ratio is small. The forward voltage is applied to the diode D3 connected between the base and the emitter of the transistor Q4, and the electric potential of the base is higher than that of the emitter. Thus, the transistor Q4 is turned off. The voltage determined by the resistor R1 and the Zener diode ZD1 is applied to the gate of the flywheel side FET Q3.

As described above, the gate voltage can be rapidly raised due to the rapid charge of the input capacitance Cgs of the flywheel side FET Q3, and the flywheel side FET Q3 can be rapidly turned on.

Then, the current flowing via the diode D2 generated by the induced voltage of the secondary winding nc2 and the current generated by the induced voltage of the tertiary winding nc3 flow via the saturable reactor SRI and the diode D1. The saturable reactor SR1 is rapidly saturated, and the impedance thereof is reduced. The sum of the induced voltage of the secondary winding nc2, the induced voltage of the tertiary winding nc3 and the voltage across the diode D1 is higher than the voltage via the diode D2 generated by the secondary winding nc2 to thereby disconnect the diode D2. This means that the current transformation ratio of the current transformer CT1 can be increased after the flywheel side FET Q3 is turned on. Thus, current controlling means of the current transformation ratio of the current transformer CT1 is formed of the saturable reactor SR1 and the diodes D1 and D2 to reduce the power loss by the current transformer CT1 when the flywheel side FET Q3 is turned on.

Next, when the switching transistor Q1 is turned on, the commutating side FET Q2 is turned on by the induced voltage of the tertiary winding n3 of the transformer T. As a result, the current generated by the induced voltage of the secondary winding n2 of the transformer T flows via the commutating side FET Q2 in the ON condition. Thus, the voltage to allow the flywheel current to flow and the voltage of the reverse polarity are applied to the current transformer CT1, and the current in the primary winding nc1 of the current transformer CT1 becomes zero. In this condition, the induced voltage of the secondary winding nc2 and that of the tertiary winding nc3 are inverted. The voltage in the reverse direction is applied to the diode D3 to this inversion. As a result, the base electric potential of the transistor Q4 is the same as the collector electrical potential via the resistor R1, and the transistor Q4 is turned on. The input capacitance Cgs of the flywheel side FET Q3 is rapidly discharged through the transistor Q4. As a result, the flywheel side FET Q3 is rapidly turned off.

Thus, the current transformer CT1 constitutes a transformer having a current transformation ratio capable of supplying a large current only by the secondary winding nc2 in the beginning of the turn-on of the flywheel side FET Q3. The input capacitance Cgs of the flywheel side FET Q3 is rapidly charged.

The current transformer CT1 also constitutes a transformer having a current transformation ratio capable of supplying a small current by the secondary winding nc2 and the tertiary winding nc3 after the flywheel side FET Q3 is turned on. Thus, the ON condition of the flywheel side FET Q3 can be maintained while the loss of the current transformer CT1 can be reduced. The rapid charge of the input capacitance Cgs increases the speed of the turn-on of the flywheel side FET Q3. Thus, the current flow period in the body diode Dq3 can be shortened, and the power loss by the body diode Dq3 can be reduced.

Figure 8:
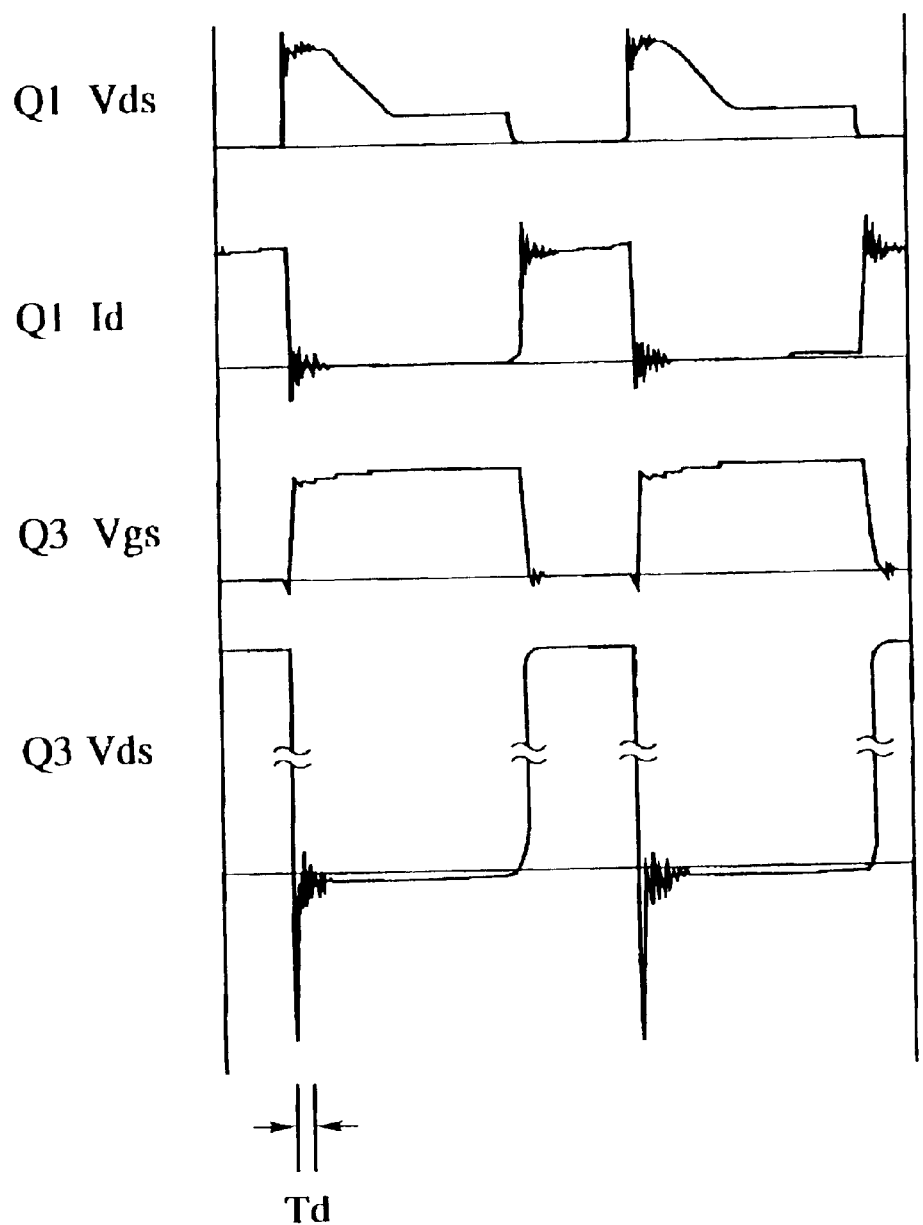
FIG. 8 is a measured waveform chart showing the operation of the first embodiment shown in FIG. 7.

FIG. 8 is the measured waveform chart showing the operation of the first embodiment shown in FIG. 7. FIG. 8 shows the waveform measured under a similar condition to that of the measured waveform shown in FIG. 6 for the prior art technology in FIG. 2.

In FIG. 8, Q1Vds and Q1Id denote the drain-source voltage and the drain current, respectively, and Q3Vgs and Q3Vds denote the gate-source voltage and the drain-source voltage of the flywheel side FET Q3, respectively. Td denotes the current flow period in the body diode Dq3 of the flywheel side FET Q3.

Figure 6:
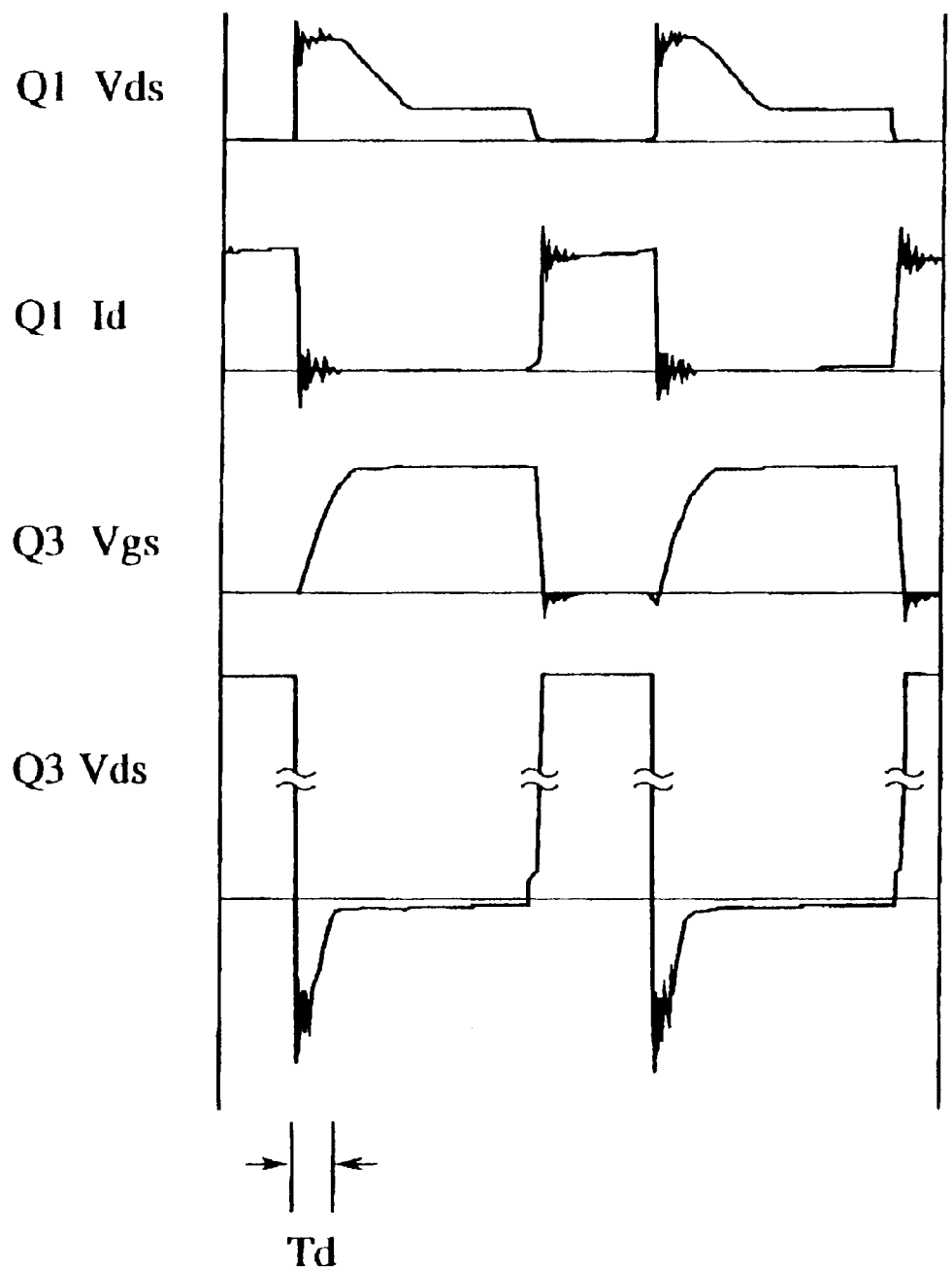
FIG. 6 is a measured waveform chart showing the operation of a prior art technology in FIG. 2.

According to the first embodiment of the present invention, the rise of the gate-source voltage Q3Vgs can be steeper than that of the prior art technology shown in FIG. 6. Thus, the period Td can be shortened compared with the value by the prior art technology shown in FIG. 6. As a result, the power loss by the body diode Dq3 is reduced.

Figure 9:
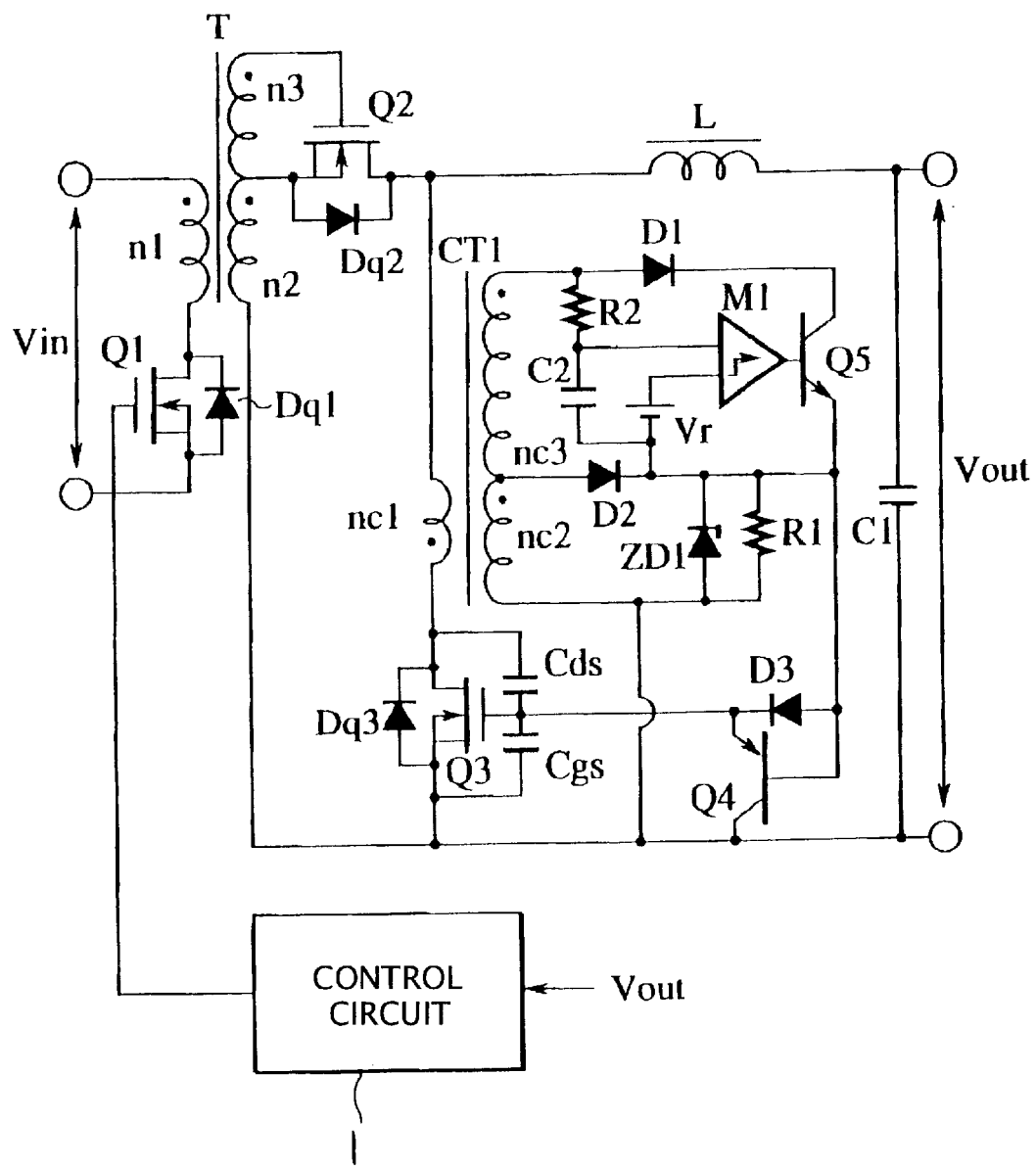
FIG. 9 is a circuit diagram according to a second embodiment of the present invention.

FIG. 9 is a circuit diagram according to a second embodiment of the present invention, wherein the same symbols are given to the same parts as those in the first embodiment shown in FIG. 7

In FIG. 9, M1 denotes a comparator having a latch function, Q5 denotes a transistor, C2 denotes a capacitor, R2 denotes a resistor, and Vr denotes a reference voltage.

A control circuit 1 implements the on-off control of a switching transistor Q1. The on-off operation of the commutating side FET Q2 based on the induced voltage of the secondary winding n2 of the transformer T and the induced voltage of the tertiary winding n3 is similar to that according to the first embodiment. The comparator M1 having the latch function implements the latch operation during the period when, for example, the polarity of the induced voltage of the tertiary winding nc3 is not changed, while the comparator is reset when the polarity is inverted.

In the second embodiment, the current transformation ratio of the secondary winding nc2 and the current transformation ratio of the tertiary winding nc3 of the current transformer CT1 are switched by the resistor R2, the capacitor C2, the comparator M1 having the latch function and the transistor Q5.

As described above, when the switching transistor Q1 is turned off and the commutating side FET Q2 is also turned off, the flywheel current flows in the primary winding nc1 of the current transformer CT1 via the body diode Dq3 of the flywheel side FET Q3. As a result, the voltage is induced in the secondary winding nc2 and the tertiary winding nc3.

In this condition, the transistor Q5 is turned off, and the induced voltage in the secondary winging nc2 is applied to the gate of the flywheel side FET Q3 via the diodes D2 and D3. Thus, the input capacitance Cgs of the flywheel side FET Q3 is rapidly charged, and the of the flywheel side FET Q3 is turned on. During that time, the induced voltage of the tertiary winding nc3 is applied to the capacitor C2 via the resistor R2, and the terminal voltage of the capacitor C2 is increased according to the time constant to be determined by the resistor and the capacitor C2. When the terminal voltage of the capacitor C2 exceeds the reference voltage Vr, the transistor Q5 is turned on by the output of the comparator M1 having the latch function. The ON condition of the transistor Q5 is maintained until the polarity of the induced voltage of the tertiary winging nc3 is inverted. Since the ON-condition of the transistor Q5 is maintained, the ON-condition of the flywheel side FET Q3 is continued. This means that the total voltage of the induced voltage of the secondary winging nc2 and the induced voltage of the tertiary winding nc3 is applied to the gate of the flywheel side FET Q3 via the diode D1, transistor Q5 and the diode D3, and the ON-condition of the flywheel side FET Q3 is continued.

As clearly described above, the flywheel side FET Q3 is turned on through a path (a first path) of the diodes D2 and D3 in the initial condition, and then, through a path (a second path) of the diode D1, the transistor Q5 and the diode D3. Thus, the current transformation ratio of the transformer T in the initial turn-on (the first path) of the flywheel side FET Q3 is smaller than the current transformation ratio of the transformer T in the subsequent turn-on condition (the second path). As a result, according to the second embodiment, the turn-on of the flywheel side FET Q3 can be increased in speed, and the power loss can be reduced by shortening the current flow period in the body diode Dq3.

Further, when the switching transistor Q1 is turned on, the commutating side FET Q2 is turned on as described above. Thus, the current flowing in the primary winding nc1 of the current transformer CT1 becomes zero, and the polarity of the induced voltage of the secondary winding nc2 and the tertiary winding nc3 is inverted. As a result, the transistor Q5 is turned off, and the transistor Q4 is turned on, the electric charges in the input capacitance Cgs of the flywheel side FET Q3 are rapidly discharged. The flywheel side FET Q3 is rapidly turned off thereby.

Figure 10:
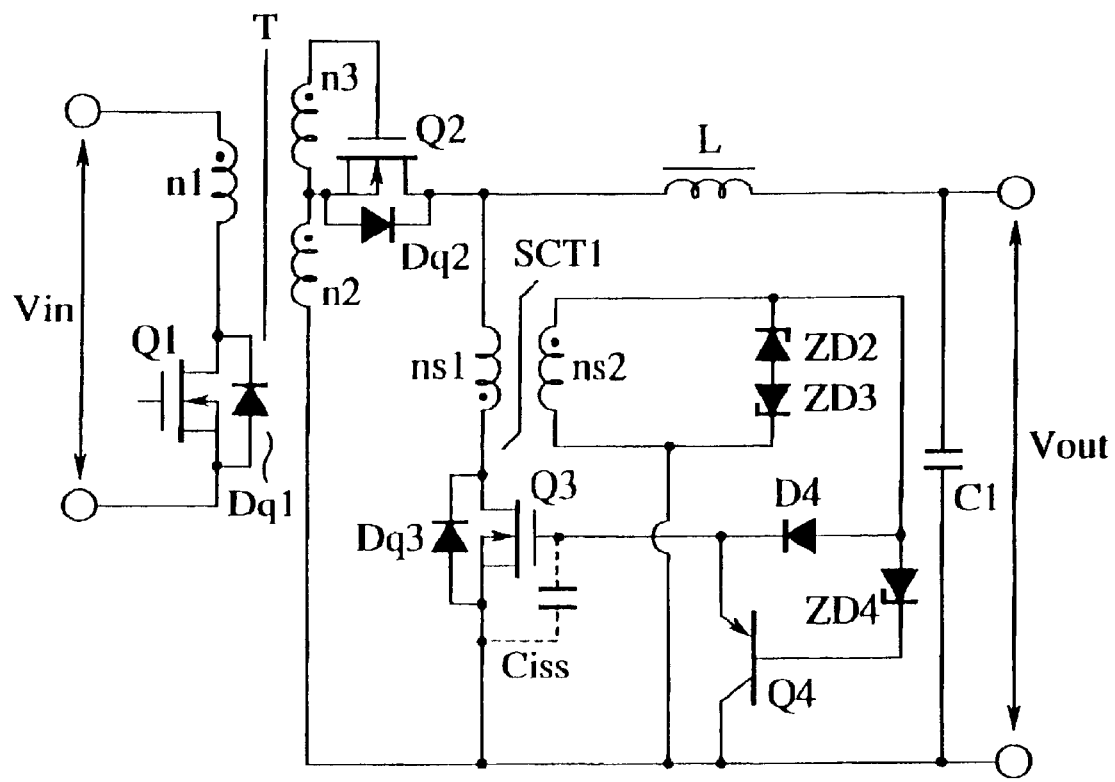
FIG. 10 is a circuit diagram according to a third embodiment of the present invention.

FIG. 10 is a circuit diagram according to a third embodiment of the present invention, wherein the same symbols are given to the same parts as those in the first embodiment shown in FIG. 7. In FIG. 10, SCT1 denotes a saturable current transformer, ns1 denotes a primary winding, ns2 denotes a secondary winding, ZD2 to ZD4 denote Zener diodes, D4 denotes a diode, Ciss denotes the input capacitance of the flywheel side FET Q3. A control circuit to implement the on-off control of the switching transistor Q1 is omitted in the figure.

As shown in FIG. 10, the Zener diodes ZD2 and ZD3 are connected to the secondary winding ns2 of the saturable current transformer SCT1 with reverse polarity. The terminal voltage of the Zener diode ZD2 is applied to the gate of the flywheel side FET Q3 via the diode D4, and also applied to the base of the transistor Q4 via the Zener diode ZD4.

The on-off control of the switching transistor Q1 and the on-off control of the commutating side FET Q2 are similar to those according to the first and second embodiments, and duplicate description is omitted. In the third embodiment, the current transformation ratio of the saturable current transformer SCT1 is switched making use of the saturation characteristic of the saturable current transformer SCT1.

As described above, when the switching transistor Q1 is turned off and the commutating side FET Q2 is turned off, the current flows in the primary winding ns1 of the saturable current transformer SCT1 via the body diode Dq3 of the flywheel side FET Q3. As a result, the voltage is induced in the secondary winding ns2 since the saturable current transformer SCT1 is not in a saturated condition. Thus, the voltage corresponding to the Zener voltage of the Zener diode ZD2 is applied to the gate of the flywheel side FET Q3 via the diode D4 to rapidly charge the input capacitance Ciss. Thus, the flywheel side FET Q3 is turned on, and the current flow period in the body diode Dq3 can be shortened. The transistor Q4 is turned off since the voltage is applied to the base via the Zener diode ZD4, and the base electric potential is higher than the emitter electric potential.

The saturable current transformer SCT1 is in the saturated condition due to the increase of the current flowing in the primary winding ns1, and the impedance of the primary winding ns1 is reduced while the induced voltage of the secondary winding ns2 is dropped to substantially zero. Thus, the loss by the saturable current transformer SCT1 is small. The turn-on of the flywheel side FET Q3 can be increased in speed, and the power loss in the flywheel side FET Q3 can be reduced by shortening the current flow period in the body diode Dq3 of the flywheel side FET Q3.

The saturable current transformer SCT1 is in a saturated condition due to the increase in the current flowing in the primary winding ns1, and the impedance of the primary winding ns1 is reduced, and the induced voltage in the secondary winding ns2 is reduced and becomes substantially zero. Thus, the loss due to the saturable current transformer SCT1 is small. Further, the current flow period of the body diode Dq3 of the flywheel side FET Q3 is shortened, the turn-on speed of the flywheel side FET Q3 is increased, and the power loss in the flywheel side FET Q3 can be reduced.

Since the switching transistor Q1 is turned on and the commutating side FET Q2 is turned on, the current flowing in the primary winding ns1 of the saturable current transformer SCT1 becomes zero, and the polarity of the induced voltage in the secondary winding ns2 is inverted. Thus, the voltage in the reverse direction is applied to the diode D4, and the base electric potential of the transistor Q4 is equal to the collector electric potential via the secondary winding nc2 and the Zener diode ZD4. The emitter electric potential of the transistor Q4 is the gate electric potential of the flywheel side FET Q3, and the transistor Q4 is turned on. Thus, the electric charges of the input capacitance Ciss of the flywheel side FET Q3 are rapidly discharged, and the flywheel side FET Q3 is turned off.

Further, since the primary winding ns1 of the saturable current transformer SCT1 is connected to the flywheel side FET Q3 in series, the current in the reverse direction flows in the primary winding ns1 if there occurs a case where the commutating side FET Q2 and the flywheel side FET Q3 are simultaneously turned on. However, in this condition, the saturable current transformer SCT1 is in a non-saturated condition, the impedance of the primary winding ns1 is increased, and the transient short-circuit current caused by the simultaneous turn-on can be suppressed. In the third embodiment, the saturable current transformer SCT1 is used, and thus, the resistor R1 (refer to FIGS. 7 and 9) in a case where the current transformer CT1 is used can be omitted. Thus, the condition where the charging current of the input capacity Ciss of the flywheel side FET Q3 becomes insufficient attributable to the existence of the resistor R1 can be prevented.

In the saturable current transformer SCT1, the voltage is induced in the secondary winding and the current flows therein only in the initial period when the switching transistor Q1 provided on the primary side of the transformer T is turned on and turned off. Thus, the ON-period and the OFF period of the switching transistor Q1 can be arbitrarily controlled. By using the saturable current transformer SCT1, the problem of the core saturation attributable to the long ON-period of the FET in using a regular current transformer can be solved.

Figure 11:
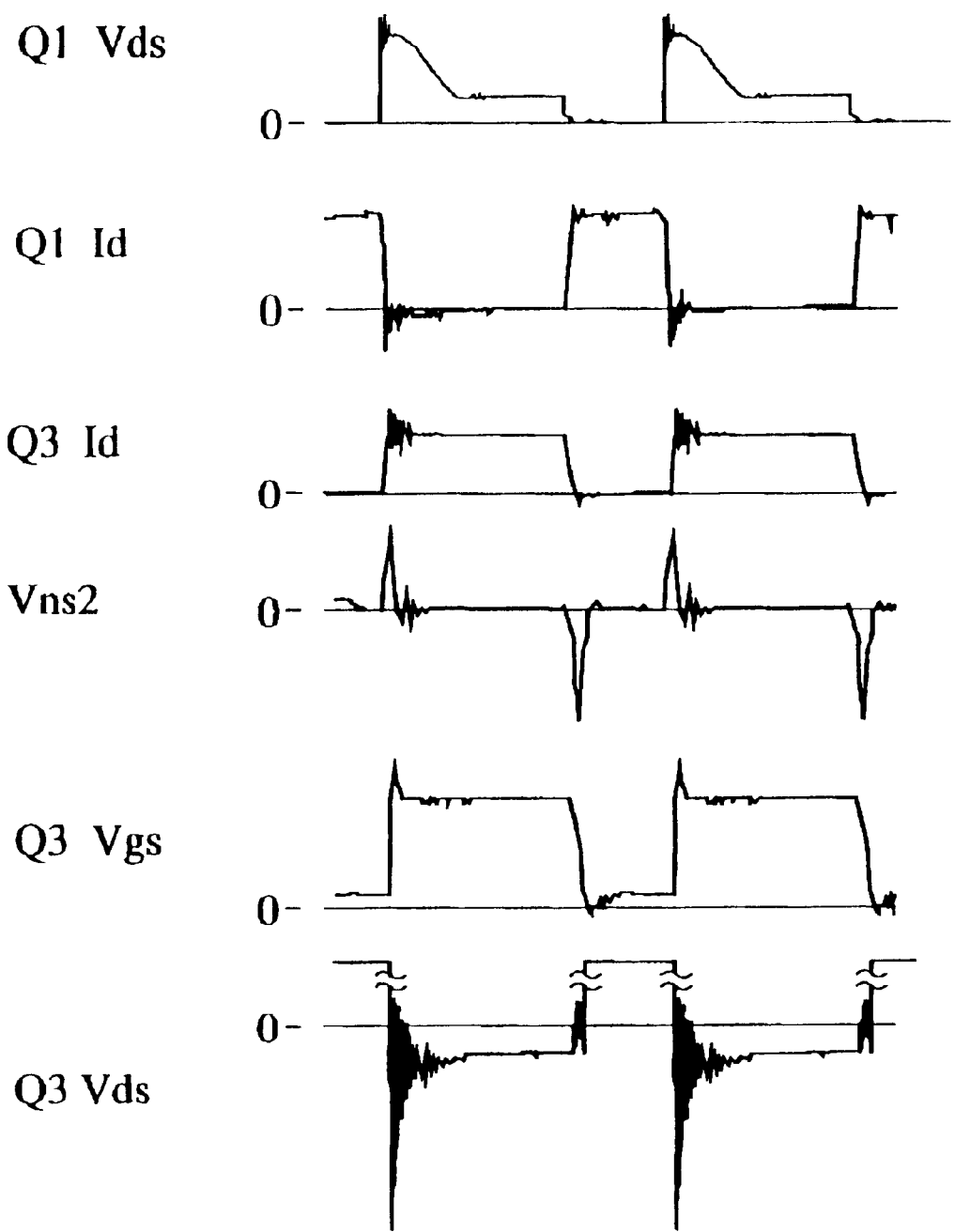
FIG. 11 is a measured waveform chart showing the operation of the third embodiment of the present invention.

FIG. 11 is a measured waveform chart showing the operation according to the third embodiment. In FIG. 11, Q1Vds denotes the drain-source voltage of the switching transistor Q1, Q1Id denotes the drain current of the switching transistor Q1, Q3Id denotes the drain current of the flywheel side FET Q3, Vns2 denotes the induced voltage of the secondary winding ns2 of the saturable current transformer SCT1, Q3Vgs denotes the gate-source voltage of the flywheel side FET Q3, and Q3Vds denotes the drain-source voltage of the flywheel side FET Q3.

The period that the drain-source voltage Q1Vds of the switching transistor Q1 is zero is the ON-period of the switching transistor Q1, and other period is the OFF-period. In the above OFF-period, the drain current Q1Id becomes zero. In the ON-period of the switching transistor Q1, the flywheel side FET Q3 is turned off, and the drain current Q3Id becomes zero. During the rise and fall of the drain current Q3Id, the induced voltage Vns2 of the secondary winding ns2 of the saturable current transformer SCT1 becomes a large value, while the induced voltage becomes close to zero.

The induced voltage Vns2 of the secondary winding ns2 of the saturable current transformer SCT1 rapidly charges the input capacitance Ciss of the flywheel side FET Q3. Thus, the gate-source Q3Vgs of the flywheel side FET Q3 rises steeply and continues the on-condition. When the polarity of the induced voltage Vns2 in the secondary winding ns2 of the saturable current transformer SCT1 is inverted, the transistor Q4 is turned on, and the above input capacitance Ciss is rapidly discharged. The gate-source Q3Vgs of the flywheel side FET Q3 has the rapid fall characteristic. Thus, the turn-on and turn-off of the flywheel side FET Q3 can be increased in speed.

As illustrated in the drain-source voltage Q3Vds of the flywheel side FET Q3, the current flow period via the body diode Dq3 can be shortened. Thus, the power loss by the body diode Dq3 and the loss due to the saturable current transformer SCT1 can be reduced.

Since the saturable current transformer SCT1 is used, a terminating resistor on the secondary side can be omitted. Thus, a situation in the light-load mode where the input capacity Ciss of the flywheel side FET Q3 lacks in charging current, and the synchronous rectification circuit becomes unable to drive can be avoided.

When the current transformer is used, the core is saturated if the ON-period of the flywheel side FET Q3 is increased. As a result a problem arises that the current transformer is not operated as the current transformer. However, no such problem arises when the saturable current transformer is used.

Figure 12:
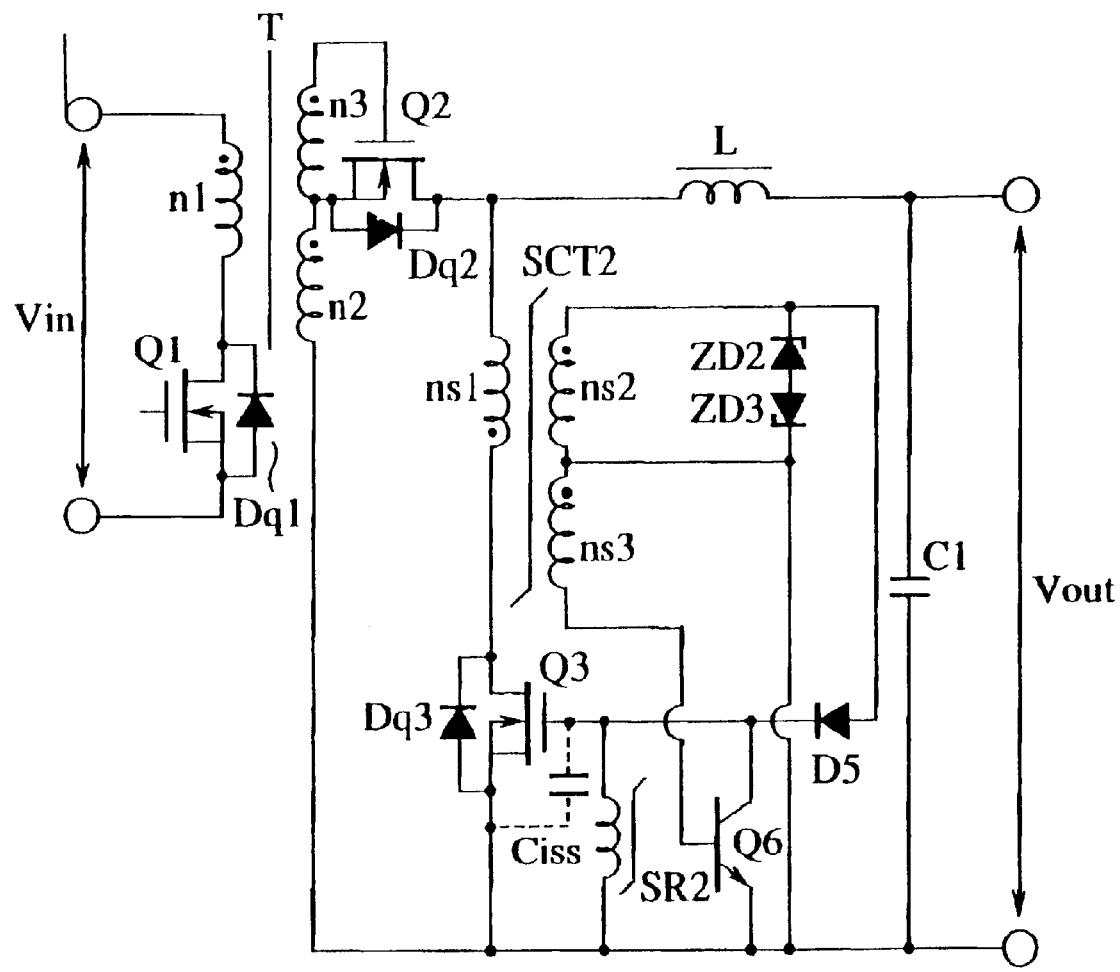
FIG. 12 is a circuit diagram according to a fourth embodiment of the present invention.

FIG. 12 is a circuit diagram according to the fourth embodiment of the present invention, wherein the same symbols are given tot he same parts as those of the third embodiment in FIG. 10. In FIG. 12, SCT2 denotes a saturable current transformer, ns1, ns2 and ns3 denote a primary winding, a secondary winding, and a tertiary winding, respectively, SR2 denotes a saturable current reactor, D5 denotes a diode, and Q6 denotes a transistor.

In the fourth embodiment, the tertiary winding ns3 is provided on the saturable current transformer SCT2, and the transistor Q6 is driven by the induced voltage of the tertiary winding ns3. In the fourth embodiment, the transistor Q6 and the saturable current reactor SR2 are connected between the gate and the source of the flywheel side FET Q3, and when the transistor Q6 is turned on, the electric charges of the input capacity Ciss of the flywheel side FET Q3 are discharged.

In the fourth embodiment shown in FIG. 12, the transistor Q6 corresponds to the transistor Q4 shown in FIG. 10, and the diode D5 corresponds to the diode D4 in FIG. 10.

When the switching transistor Q1 is turned off, the commutating side FET Q2 is turned off. In this condition, the induced voltage in the secondary winding ns2 of the saturable current transformer SCT2 is applied to the gate of the flywheel side FET Q3 via the diode D5. As a result, the flywheel side FET Q3 is turned on. The induced voltage in the tertiary winding ns3 is applied between the base and the emitter of the transistor Q6, and the transistor Q6 is turned off while the base electric potential is kept lower than the emitter electric potential.

When the switching transistor Q1 is turned on, the commutating side FET Q2 is turned on. The current flowing in the primary winding ns1 of the saturable current transformer SCT2 becomes zero, and the polarity of the induced voltage in the secondary winding ns2 and the tertiary winding ns3 is inverted. The induced voltage in the tertiary winding ns3 is applied between the base and the emitter of the transistor Q6, and the base electric potential is kept higher than the emitter electric potential. Thus, the transistor Q6 is turned on. The input capacitance Ciss of the flywheel side FET Q3 is rapidly discharged, and the flywheel side FET Q3 is turned off.

The saturable current reactor SR2 forcibly turns off the flywheel side FET Q3 when the flywheel side FET Q3 is unsuccessfully turned off. This means that the input capacitance Ciss of the flywheel side FET Q3 is charged via the diode D5, and the input capacitance Ciss of the flywheel side FET Q3 is discharged by turning on the transistor Q6. When this operation is normal, the saturable current reactor SR2 is in a non-saturated condition, and high in impedance.

However, if the transistor Q6 is not turned on, only the current in one direction flows in the saturable current reactor SR2, resulting in a saturated condition with low impedance. This condition is the same as that when the transistor Q6 is turned on. The electric charges of the input capacitance Ciss of the flywheel side FET Q3 are discharged through the saturable current reactor SR2 in the above-described low impedance condition, and as a result, the flywheel side FET Q3 is turned off.

In the saturable current transformer SCT2, the voltage is induced in the secondary winding ns2 and the current flows therein only in the initial period when the switching transistor Q1 provided on the primary side of the transformer T is turned on/off. Thus, the ratio of the ON-period to the OFF-period of the switching transistor Q1 can be arbitrarily controlled. Thus, a problem of the core saturation attributable to the long ON-period of the FET when a regular current transformer is used can be solved by using the saturable current transformer SCT2.

In the above-described embodiments, a high-frequency core is used in the saturable current transformers SCT1 and SCT2, and the above high-frequency core can be used in an area of magnetic saturation.

The invention is not limited to the above embodiments and various modifications may be made without departing from the spirit and scope of the invention. Any improvement may be made in part or all of the components.

What is claimed is:

1. A synchronous rectification circuit of a DC-DC converter comprising:

a switching transistor for on-off controlling a current flowing in a primary winding on a primary side of a transformer;

a commutating side FET for being on-off controlled by an induced voltage in a tertiary winding on a secondary side of said transformer being applied to a gate of said commutating side FET, and an induced voltage in a secondary winding on the secondary side of said transformer being applied to a source of said commutating side FET;

a current transformer in which a drain of said commutating side FET is connected to one end of a primary winding on a primary side;

a flywheel side FET for being on-off controlled by the other end of said primary winding on the primary side of said current transformer being connected to a drain of said flywheel side FET, and an induced voltage in a secondary winding on a secondary side of said current transformer being applied to a gate of said flywheel side FET; and current controlling means for setting a current transformer ratio of said current transformer to be a first value during an initial period when said flywheel side FET is turned on, and for setting the current transformation ratio of said current transformer to be a second value after said initial period has elapsed, wherein said second value is larger than said first value.

2. A synchronous rectification circuit of a DC-DC converter according to claim 1, whereby the current controlling means for switching the current transformation ratio of said current transformer comprises:

a saturable reactor and a first diode connected to each other in series in which the total voltage of the induced voltage in the secondary winding on the secondary side and an induced voltage in a tertiary winding on the secondary side of said current transformer is applied to a gate of said flywheel said FET; and a second diode in which the induced voltage in the secondary winding on said secondary side of said current transformer is applied to the gate of said flywheel side FET.

3. A synchronous rectification circuit of a DC-DC converter according to claim 1, wherein the current controlling means for switching the current transformation ratio of said current transformer comprises:

a capacitor in which the secondary winding on the secondary side and a tertiary winding on the secondary side of said current transformer are connected to each other in series, and to which a total of the induced voltages in the secondary winding on said secondary side and the tertiary winding on said secondary side is applied via a resistor;

a transistor which turns on when an output voltage of said capacitor exceeds a preset value;

a first diode for applying the total voltage of the induced voltages of said secondary winding and said tertiary winding to the gate of said flywheel side FET via said transistor when said transistor turns on; and a second diode in which the induced voltage in said secondary winding is applied to the gate of said flywheel side FET.

4. A synchronous rectification circuit of a DC-DC converter according to claim 1, further comprising a transistor which is connected between the gate and the source of said flywheel side FET, and turned off when said FET is turned on, and turned on when said FET is turned off, and which discharges electric charges of an input capacitance of said FET.

5. A synchronous rectification circuit of a DC-DC converter according to claim 2, further comprising a transistor which is connected between the gate and the source of said flywheel side FET, and turned off when said FET is turned on, and turned on when said FET is turned off, and which discharges electric charges of an input capacitance of said FET.

6. A synchronous rectification circuit of a DC-DC converter according to claim 3, further comprising a transistor which is connected between the gate and the source of said flywheel side FET, and turned off when said FET is turned on when said FET is turned off, and which discharges electric charges of an input capacitance of said FET.

7. A synchronous rectification circuit of a DC-DC converter comprising:

a switching transistor for on-off controlling a current flowing in a primary winding on a primary side of a transformer;

a commutating side FET for being on-off controlled by an induced voltage in a tertiary winding on a secondary side of said transformer being applied to a gate of said commutating side FET, and an induced voltage in a secondary winding on said secondary side of said transformer being applied to a source of said commutating side FET;

a current transformer in which a drain of said commutating side FET is connected to one end of a primary winding on a primary side; and a flywheel side FET for being on-off controlled by the other end of said primary winding on the primary side of said current transformer being connected to a drain of said flywheel side FET, and an induced voltage in a secondary winding on a secondary side of said current transformer being applied to a gate of said flywheel side FET, wherein said current transformer is a saturable current transformer, said saturable current transformer comprising a diode for applying the induced voltage in the secondary winding of said saturable current transformer to the gate of said flywheel side FET.

8. A synchronous rectification circuit of a DC-DC converter comprising:

a switching transistor for on-off controlling a current flowing in a primary winding on a primary side of a transformer;

a commutating side FET for being on-off controlled by an induced voltage in a tertiary winding on a secondary side of said transformer being applied to a gate of said commutating side FET, and an induced voltage in a secondary winding on a secondary side of said transformer being applied to a source of said commutating side FET;

a saturable current transformer in which a secondary winding on a secondary side and a tertiary winding on the secondary side are connected to each other in series;

a diode for applying an induced voltage in the secondary winding on said secondary side of said saturable current transformer to the gate of said flywheel side FET; and a transistor for applying an induced voltage in the tertiary winding on the secondary side of said saturable current transformer to a base to turn on the transistor when said flywheel side FET turns off, and for discharging electric charges of an input capacitance of said flywheel side FET.

* * * * *

UNITED STATES PATENT AND TRADEMARK OFFICE
CERTIFICATE OF CORRECTION

PATENT NO. : 6,430,063 B1
DATED : August 6, 2002
INVENTOR(S) : Katsuhiko Nishimura et al.

It is certified that error appears in the above-identified patent and that said Letters Patent is hereby corrected as shown below:

Column 1,
Line 9, replace "induces in a" with -- induced in a --

Column 2,
Line 3, replace "like or the" with -- like of the --

Column 3,
Line 1, Insert "When the switching transistor Q1 is turned on, the commutating side FET Q2 is turned on by the induced voltage in the tertiary winding n3 of the transformer T. As a result, the current by the induced voltage in the secondary winding n2 of the transformer T flows via the turned-on commutating side FET Q2. Thus, the current flowing in the current transformer CT becomes zero.
   The induced voltage in the secondary winding of the current transformer CT is inverted, and the reverse voltage is applied to the diode D8. The diode D8 is provided between the emitter and the base of the transistor Q4, and the base of the transistor Q4 is disconnected from the emitter. As a result, the base electric potential of the transistor Q4 becomes equal to the collector electric potential via the resistor R3, and the transistor Q4 is turned on. Thus, the gate and the source of the flywheel side FET Q3 are in a short-circuit condition, and the electric charges of the input capacitance Cgs are rapidly discharged. Thus, the flywheel side FET Q3 is turned off."

UNITED STATES PATENT AND TRADEMARK OFFICE
CERTIFICATE OF CORRECTION

PATENT NO. : 6,430,063 B1
DATED : August 6, 2002
INVENTOR(S) : Katsuhiko Nishimura et al.

It is certified that error appears in the above-identified patent and that said Letters Patent is hereby corrected as shown below:

<u>Column 4 (cont'd),</u>
Line 45,
```
Insert "According to another
aspect of the present invention,
a saturable current transformer
is used for a current transformer
of the synchronous rectification
circuit.  By this, after the
flywheel side FET is turned on,
the primary winding of the
saturable current transformer is
saturated and the impedance
thereof is reduced.  Thus, the
driving loss can be further
reduced.  Also, even when the
commutating side FET and the
flywheel side FET are
simultaneously turned on,
excessive current flow can still
be suppressed, because the
impedance of the primary winding
of the above saturable current
transformer is increased."
```

Line 60, replace "secondary winging" with -- secondary winding --

<u>Column 8,</u>
Lines 21 and 38, replace "secondary winging" with -- secondary winding --
Line 34, replace "tertiary winging" with -- tertiary winding --

<u>Column 11,</u>
Line 7, replace "capacity Ciss" with -- capacitance Ciss --
Line 17, replace "tot he same" with -- to the same --

Signed and Sealed this

Thirteenth Day of May, 2003

JAMES E. ROGAN
*Director of the United States Patent and Trademark Office*